United States Patent
Ruffo (10) Patent No.: US 7,328,758 B2
(45) Date of Patent: Feb. 12, 2008

(54) SELF-PROPELLED VEHICLE PARTICULARLY FOR MAKING TURNS WITH TIGHT TURNING RADII

(75) Inventor: Massimiliano Ruffo, Verona (IT)

(73) Assignee: Comac S.p.A., San Giovanni Lupatoto (IT)

( * ) Notice: Subject to any disclaimer, the term of this patent is extended or adjusted under 35 U.S.C. 154(b) by 228 days.

(21) Appl. No.: 11/062,640

(22) Filed: Feb. 23, 2005

(65) Prior Publication Data

US 2005/0252186 A1  Nov. 17, 2005

(30) Foreign Application Priority Data

May 10, 2004  (IT)  .......................... VR2004A0079

(51) Int. Cl.
*B60K 17/30* (2006.01)
(52) U.S. Cl. .................. 180/6.28; 180/6.32; 180/6.5; 180/6.34; 180/6.25; 477/1; 477/6
(58) Field of Classification Search .............. 180/6.28, 180/6.32, 6.5, 6.34, 6.26; 477/1, 6
See application file for complete search history.

(56) References Cited

U.S. PATENT DOCUMENTS

| | | | |
|---|---|---|---|
| 2,392,423 A | 1/1946 | Stephens | |
| 4,858,739 A | 8/1989 | Nemoto et al. | |
| 5,018,592 A | 5/1991 | Buchdrucker et al. | |
| 6,123,398 A * | 9/2000 | Arai et al. | ................... 303/140 |
| 6,363,630 B1 * | 4/2002 | Ziegler | ......................... 37/257 |
| 6,968,933 B2 * | 11/2005 | Buckhouse et al. | ......... 192/69.4 |
| 7,074,151 B2 * | 7/2006 | Thompson | .................. 475/225 |

FOREIGN PATENT DOCUMENTS

| | | |
|---|---|---|
| DE | 38 11 049 A1 | 11/1988 |
| GB | 722 709 A | 1/1955 |
| SU | 1 117 942 A1 | 4/1989 |

* cited by examiner

*Primary Examiner*—Lesley D. Morris
*Assistant Examiner*—Marlon Arce-Diaz
(74) *Attorney, Agent, or Firm*—Modiano & Associati; Albert Josif; Daniel J. O'Byrne (57) ABSTRACT

A self-propelled vehicle particularly for making turns with tight turning radii, comprising a chassis provided with two driving wheels forming at least one driving portion, and which supports a motor kinematically connected to a motion distribution shaft. A functional connection is provided between the motion distribution shaft and each one of the driving wheels and is individually activatable or deactivatable on command for independent actuation of the driving wheels. A steering adapted to act on the functional connection, the latter comprising, between the motion distribution shaft and at least one of the driving wheels, a respective clutch coupling, activatable or deactivatable by the steering device.

11 Claims, 6 Drawing Sheets

SELF-PROPELLED VEHICLE PARTICULARLY FOR MAKING TURNS WITH TIGHT TURNING RADII

The present invention relates to a self-propelled vehicle particularly for making turns with reduced turning radii.

BACKGROUND OF THE INVENTION

Land vehicles used for excavation work or provided with floor cleaning means are known which are capable of making turns with tight turning radii.

In particular, WO 02/46023 A1 discloses a self-propelled vehicle of the type described above, which has the particular characteristic of having a single driving motor, which can be kinematically connected, by way of functional connection means, selectively to two driving wheels in order to allow to turn the vehicle about the wheel whereto rotation is not transmitted.

These functional connection means are composed, for each driving wheel, by a kinematic connection shaft, which can oscillate, with respect to the structure of the vehicle, about an axis that is parallel and spaced thereto and on which a guiding pulley and a driving pulley are keyed, a first belt connected to a transmission shaft that receives motion from single motor being wound around the guiding pulley and the corresponding driving wheel being connected to the driving pulley by means of a second belt.

In practice, thanks to the oscillation of the kinematic connection shaft, which can be performed by means of appropriately provided control levers, it is possible to vary the tension of the first and second belts and deactivate, if the belts slacken, transmission of motion from the transmission shaft to the corresponding driving wheel. Accordingly, by deactivating the transmission of one driving wheel and keeping the other driving wheel engaged with the single motor, the vehicle is turned about the wheel that is disconnected from the motor and therefore remains idle.

Although this constructive solution is valid from a conceptual standpoint, it has proved to be not fully satisfactory from a practical standpoint, since deactivation of transmission provided by the oscillation of the kinematic connection shaft causes slippage of the belts on the guiding pulley or on the driving pulley, which rather rapidly causes wear of said belts, with a consequent increase in maintenance costs, especially in case of application to cleaning machines, due to the high temperatures reached during their use.

SUMMARY OF THE INVENTION

The aim of the present invention is to eliminate the drawbacks noted above by providing a self-propelled vehicle particularly for making turns with tight turning radii, which thanks to its particular constructive characteristics can offer higher reliability as well as the greatest assurances of safety in operation.

Within this aim, an object of the present invention is to provide a self-propelled vehicle particularly for making turns with tight turning radii that is very easy to use in all of its possible applications.

Another object of the present invention is to provide a self-propelled vehicle particularly for making turns with tight turning radii that has a very simple structure so as to be competitive also from a merely economical standpoint.

This aim and these and other objects that will become better apparent hereinafter are achieved by a self-propelled vehicle particularly for making turns with tight turning radii according to the invention, comprising a chassis, which is provided with two driving wheels, forms at least one driving portion, and supports a motor that is kinematically connected to a motion distribution shaft, functional connection means being provided between said motion distribution shaft and each one of said driving wheels, said functional connection means being individually activatable or deactivatable on command for independent actuation of one driving wheel with respect to the other, and steering means that are adapted to act on said functional connection means, characterized in that said functional connection means comprise, between said motion distribution shaft and at least one of said driving wheels, a respective clutch coupling, which can be activated or deactivated on command by way of said steering means.

BRIEF DESCRIPTION OF THE DRAWINGS

Further characteristics and advantages of the invention will become better apparent from the description of a preferred but not exclusive embodiment of the vehicle according to the invention, illustrated by way of non-limiting example in the accompanying drawings, wherein.

Figure 1:
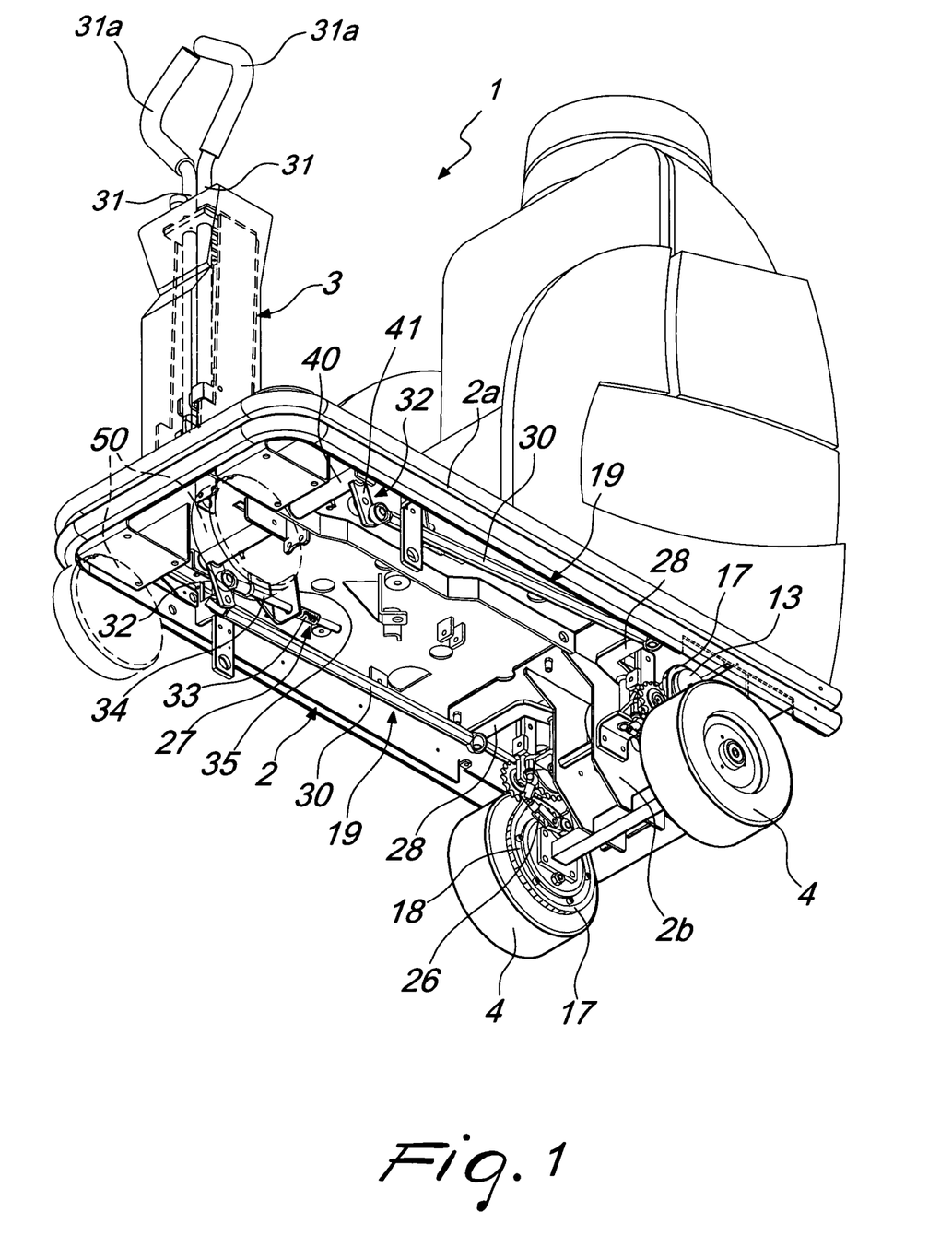
FIG. 1 is a schematic bottom perspective view of an embodiment of the vehicle according to the invention, with parts omitted for the sake of greater clarity.
Figure 2:
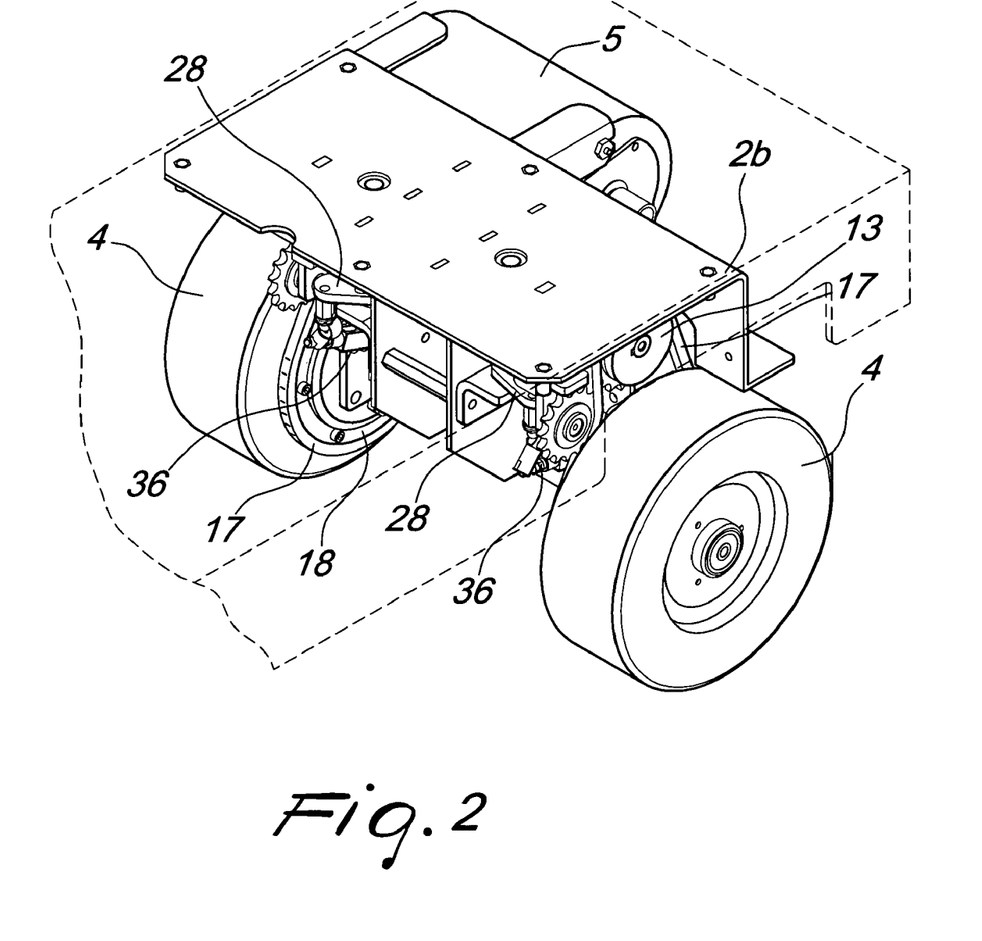
FIG. 2 is a perspective view of the means for functional connection between the motion distribution shaft and each one of the driving wheels, with some parts omitted.
Figure 3:
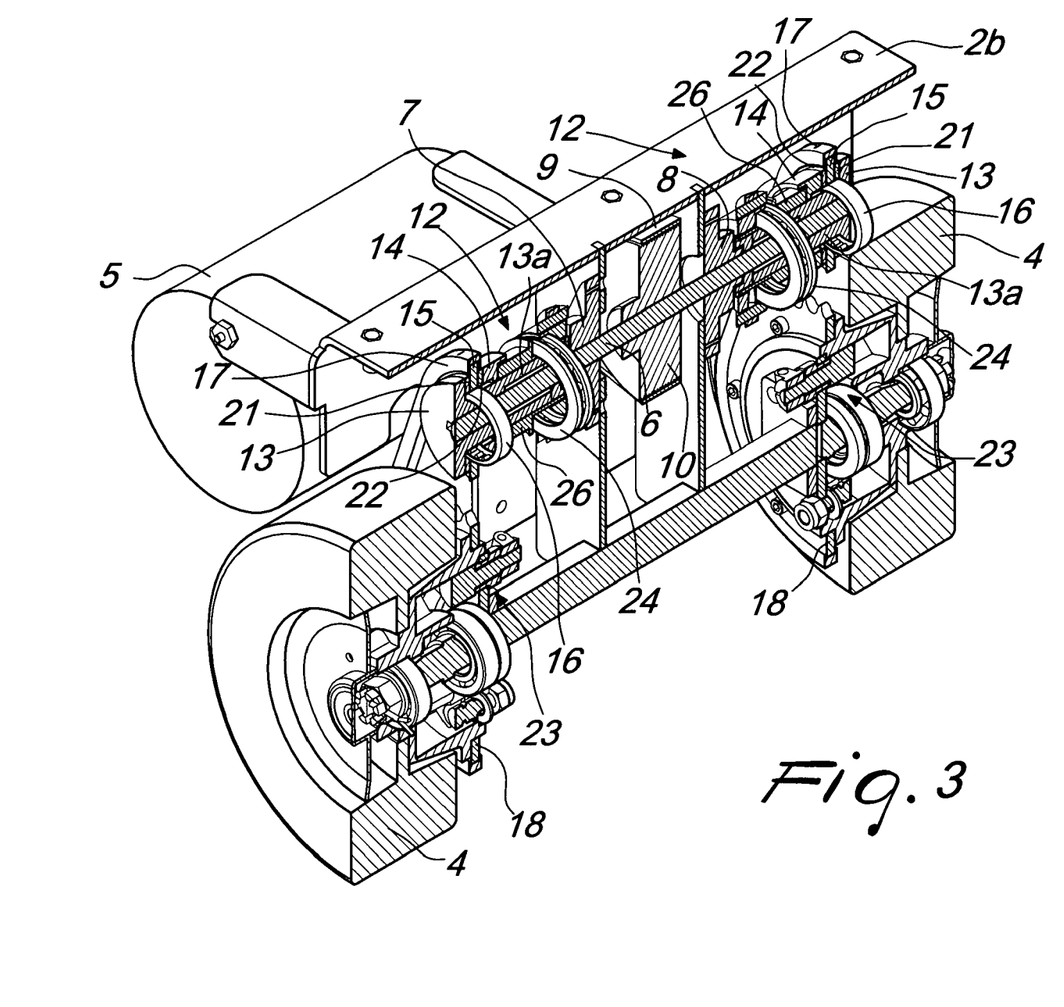
FIG. 3 is a view that is similar to FIG. 2 but is partially a cutout in order to clearly illustrate the internal components.
Figure 4:
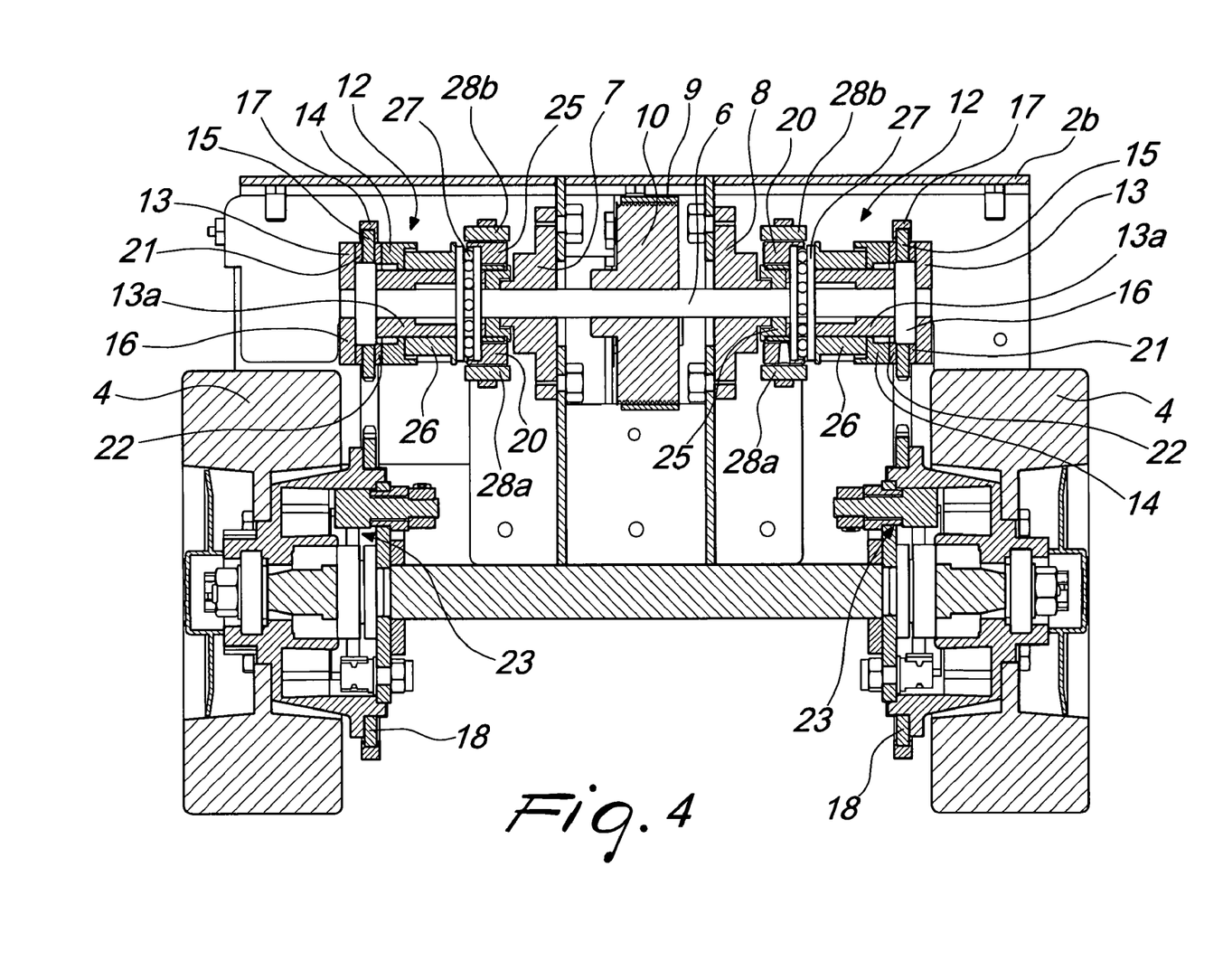
FIG. 4 is a schematic axial sectional view of the means for functional connection between the motion distribution shaft and each of the driving wheels.
Figure 5:
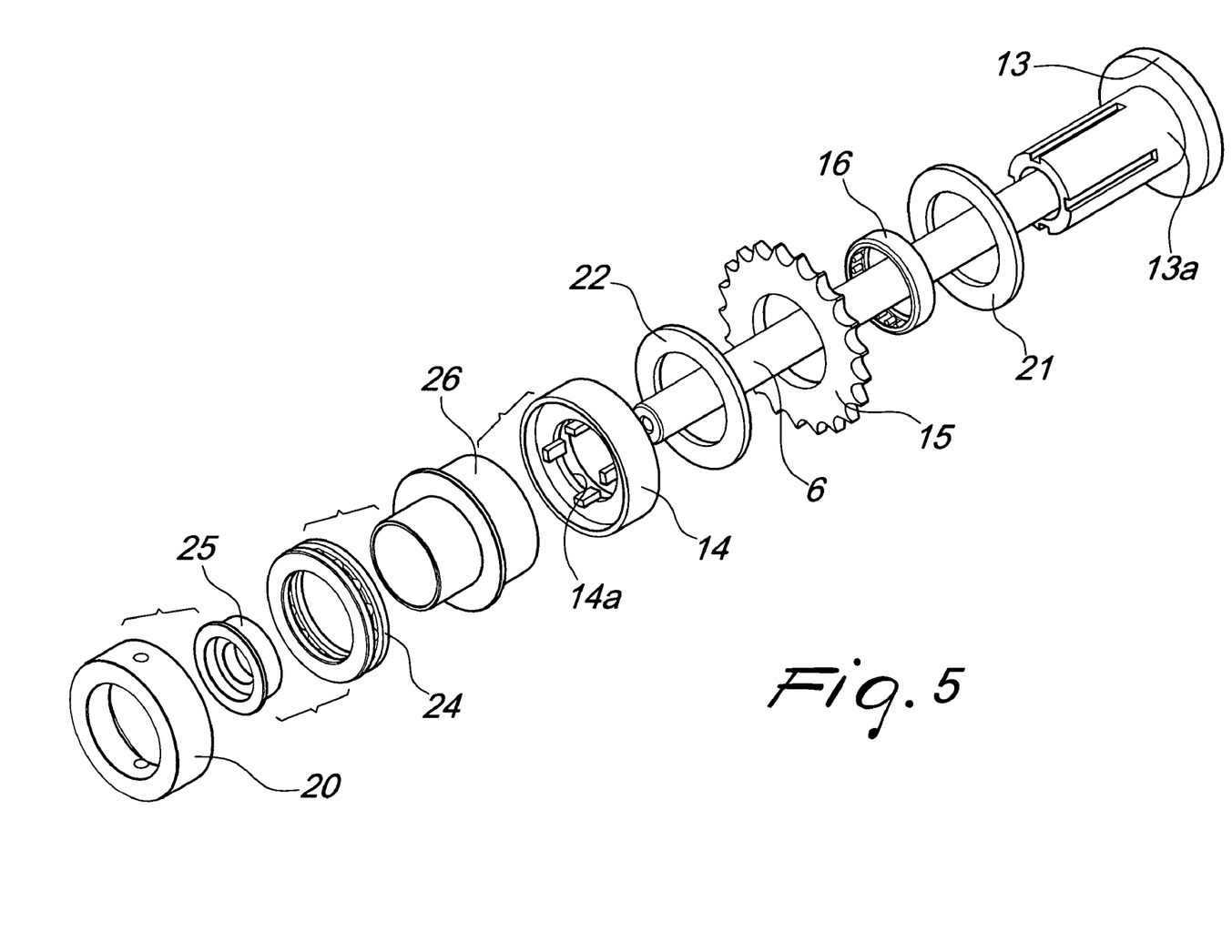
FIG. 5 is a schematic exploded perspective view of a clutch coupling.
Figure 6:
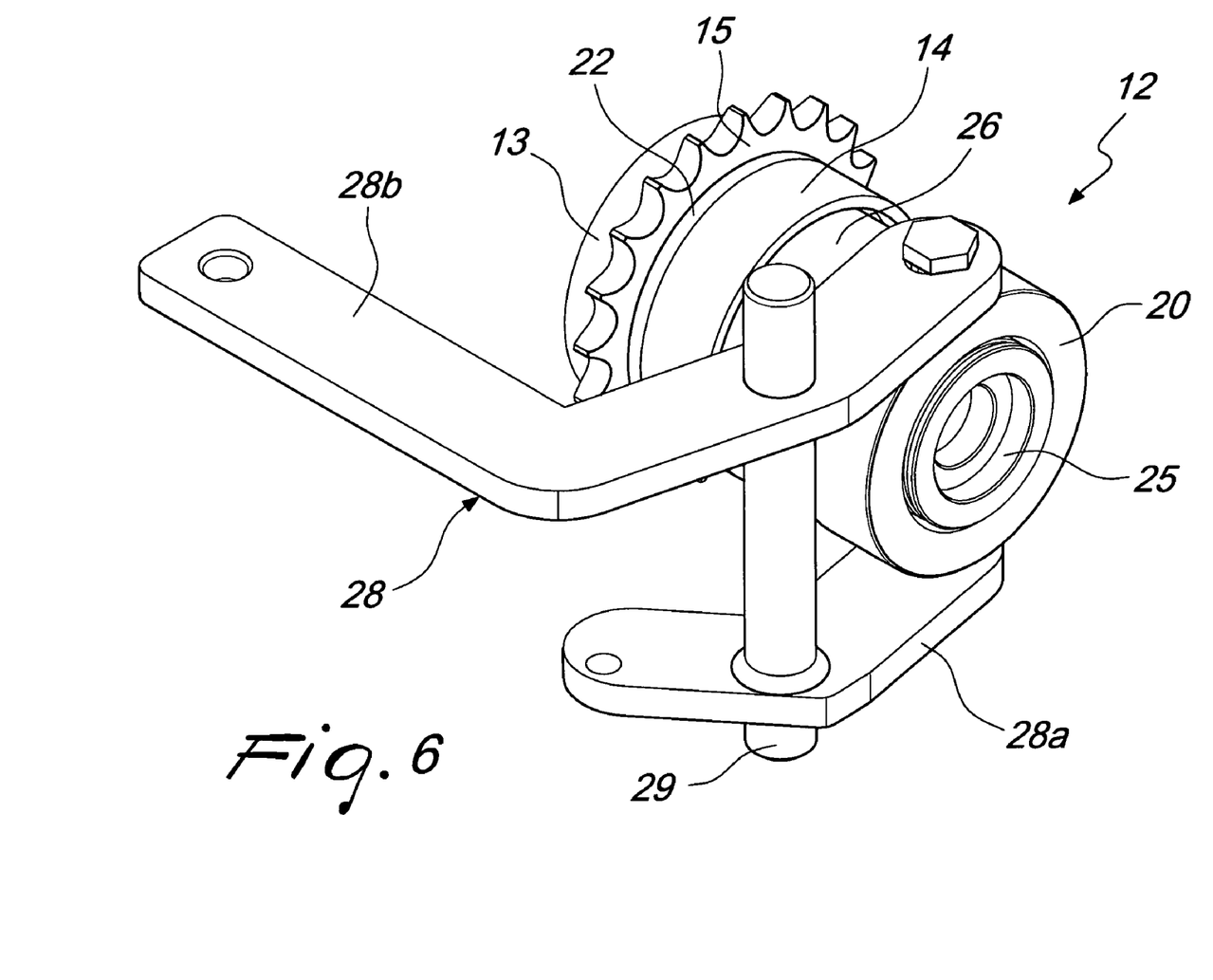
FIG. 6 is a schematic perspective view of components of the clutch coupling of FIG. 5.

In the examples of embodiments that follow, individual characteristics, given in relation to specific examples, may actually be interchanged with other different characteristics that exist in other examples of embodiments.

Moreover, it is noted that everything found to be already known during the patenting process is understood not to be claimed and to be the subject of a disclaimer.

DESCRIPTION OF THE PREFERRED EMBODIMENTS

With reference to the figures, the vehicle according to the invention, generally designated by the reference numeral 1, comprises a chassis 2, on which at least one driving portion 3 for the user is provided. The chassis 2 supports, so that it can rotate substantially about a same axis, two driving wheels 4, which are arranged for example at the rear of the vehicle 1 with respect to its forward travel direction.

A motor 5 is further mounted on the chassis 2 and is for example of the electric type and preferably of the permanent-magnet type, so that it is possible to reverse the direction of rotation of its output shaft. It should be noted that the motor 5 can also be constituted by an internal-combustion engine.

With reference to the example of embodiment shown in the figures, the chassis 2 is formed by a plurality of parts and in particular comprises a base 2a whereto a support 2b is fixed which is designed to support the motor 5, in a per se known manner.

The motor 5 is kinematically connected to a motion distribution shaft 6, which is supported so that it can rotate about its own axis, preferably with the interposition of appropriately provided bearings 7 and 8, on the chassis 2 and more specifically on the support 2b, according to the illustrated example.

For example, the motor 5 is connected to the motion distribution shaft 6 by means of a belt 9, which transmits motion from a first pulley (not shown), which is keyed to the output shaft of the motor 5, to a second pulley 10, which is keyed to the motion distribution shaft 6.

The motion distribution shaft 6 is designed to provide rotary motion to the two driving wheels 4 independently of each other by way of functional connection means, which can be activated or deactivated individually on command by way of steering means in order to steer the vehicle 1.

According to the invention, said functional connection means comprise a clutch coupling, generally designated by the reference numeral 12, which is interposed between the motion distribution shaft 6 and one of the driving wheels 4. Preferably, a respective clutch coupling 12 is provided between the motion distribution shaft 7 and each driving wheel 4.

Generally speaking, each clutch coupling 12 is conveniently composed of a first coupling portion 13, which is rigidly coupled to the motion distribution shaft 6, for example by using keys or another type of coupling, and a second coupling portion 14, which is fitted around the motion distribution shaft 6 and can slide axially along the motion distribution shaft 6 though being rigidly coupled thereto in rotating or for joint rotation therewith about its axis. The second coupling portion 14 in fact is provided with a through hole 14a, which has a slotted profile and mates with a slotted portion formed on a sleeve 13a, which constitutes an axial extension of the first coupling portion 13.

Advantageously, the functional connection means further comprise a mechanical motion transmission between each clutch coupling 12 and the respective driving wheel 4.

Conveniently, said mechanical motion transmission is constituted by a toothed pulley 15, which is fitted so that it can rotate about the motion distribution shaft 6 and can slide axially along the motion distribution shaft 6. More particularly, the toothed pulley 15 is interposed between the first coupling portion 13 and the second coupling portion 14 and is advantageously associated, so that it can rotate about its own axis, with the sleeve 13a of the first coupling portion 13, for example by interposing a roller bearing 16. The toothed pulley 15 is connected, by means of a chain 17, to a sprocket 18, which is arranged coaxially with respect to a respective driving wheel 4 and is rigidly rotationally coupled thereto.

Conveniently, said steering means comprise actuation means 19, which are functionally connected to a pusher 20, which is designed to act on the second coupling portion 14 in order to produce its axial sliding along the motion distribution shaft 6 from a deactivation position, in which said second coupling portion 14 is spaced and therefore disengaged from the toothed pulley 15, to an activation position, in which the first coupling portion 13 and the second coupling portion 14 are coupled, on opposite sides, to the toothed pulley 15, so as to rotationally associate the toothed pulley 15 with the motion distribution shaft 6.

Advantageously, a first clutch element 21 is interposed between the first coupling portion 13 and the toothed pulley 15 and a second clutch element 22 is interposed between the second coupling portion 14 and the toothed pulley 15. The first and second clutch elements 21 and 22 are made of a material that has a high friction coefficient, such as for example the material commercially known as brake lining or other similar material. The presence of the first and second clutch elements 21 and 22 ensures effectively, during activation of the clutch coupling 12, mating with limited slippage of the first coupling portion 13 and of the second coupling portion 14 on the two opposite faces of the toothed pulley 15.

Conveniently, the actuation means 19 are also functionally connected to a braking device 23 of a respective driving wheel 4, for substantially simultaneous activation or deactivation of the clutch coupling 12 and of the braking device 23. Said braking device 23 can be for example a drum brake or a brake of any other kind.

Advantageously, the pusher 20 comprises an annular body, which is arranged so that it can slide around or on the motion distribution shaft 6 for example by interposing a centering ring 25. Conveniently, a spacer 26 and a thrust bearing 24 are interposed between the pusher 20 and the second coupling portion 14.

Conveniently, the actuation means 19 comprise a fork-like element 28, which rotatably supports, with an end of its own arms 28a and 28b, the pusher 20 at two diametrically opposite regions of its lateral outer surface. In particular, in an intermediate portion of its arms, the fork-like element 28 is pivoted to the chassis 2 about a pivoting axis, which is formed by a pivot 29 that is substantially perpendicular to the motion distribution shaft 6, so that when the fork-like element 28 is rotationally actuated about its pivoting axis it can produce the sliding of the pusher 20 in one direction or the other along the motion distribution shaft 6.

Advantageously, one of the arms of the fork-like element 28 (by way of example the arm 28a) is connected articulately, at its own end that is arranged opposite the end at which it is associated with the pusher 20, to an actuation tension member 36, which in turn acts on a respective braking device 23 so that a rotation of the fork-like element 28 in one direction or the other about its own pivoting axis can be converted into an activation or deactivation of said braking device 23.

Conveniently, the sliding motion of the pusher 20 along the motion distribution shaft 6, in the direction that causes the engagement of the second coupling portion 14 with the toothed pulley 15, is elastically biased by elastic return means 27, which act on the actuation means 19. Advantageously, said elastic return means 27 are adapted to also bias the transition of the braking device 23 from its activation condition to its deactivation condition.

In a preferred example of embodiment, the actuation means 19 further comprise an actuation bar 30, which is pivoted, at one of its longitudinal ends, to the end that lies opposite the end that is connected to the pusher 20 of an arm (for example the arm 28b) of the fork-like element 28 and is connected, at its opposite longitudinal end, to an end of a control lever 31 by means of an appropriately provided kinematic connection 32.

The control lever 31 is pivoted, in an intermediate portion, to the chassis 2 about an axis that is substantially perpendicular to its longitudinal direction and has, at its end that is opposite to the end connected to the actuation bar 30, a control handle 31a.

Conveniently, the angular strokes of the control lever 31 are controlled by said elastic return means 27, which are preferably adjustable and are connected by a spring 33, which is fitted coaxially to a bar 34, which acts on the kinematic connection 32 and is arranged between an abutment 35, which is rigidly coupled to the chassis 2, and a shoulder, which is associated with the bar 34 and can move along it with respect to the abutment 35, in order to adjust the pretension of the spring 33.

More particularly, the elastic return means 27 tend to keep the control levers 31 in a substantially vertical inactive position, in which the driving wheels 4 are both disconnected from the motion distribution shaft 6 and therefore from the motor 5 due to the deactivation of the clutch couplings 12, and are both locked in their rotation by the respective braking device 23, so that in this situation, even when the motor 5 is on, the vehicle 1 remains motionless.

Advantageously, devices for controlling the motor 5, of a per se known type, are provided at the driving portion 3; by virtue of said means, it is possible to switch the motor 5 on or off, change its rotation rate, and optionally also reverse its motion.

Preferably, the vehicle according to the invention is further provided with at least one self-orientating castor 50, which is mounted for example at the front on the chassis 2 preferably so that it can rotate freely about a substantially vertical axis in order to allow easy driving of the vehicle 1, avoiding excessive sliding over the ground.

Operation of the vehicle according to the invention is as follows.

When the user does not act on the control levers 31, the elastic return means keep said control levers 31 in a substantially vertical inactive position. In this situation, as mentioned above, the clutch couplings 12 are deactivated and the braking devices 23 of the driving wheels 4 are in the activation condition, and therefore the driving wheels 4 are both uncoupled from the motor 5 and are rotationally locked.

If the user wishes to actuate forward straight travel, he acts (while the motor 5 is on) by moving for example backwardly the actuation handle 31a of both control levers 31. The consequent angular movement of the control levers 31 is converted by means of the actuation bars 30, into a rotation of the fork-like elements 25, which at the same time produces the sliding of the pushers 20 in the direction that causes the engagement of the second coupling portions 14 with the toothed pulleys 15 and the coupling of the toothed pulleys 15 with the first coupling portions 13 and the deactivation of the braking devices 23 of the driving wheels 4. In this situation, therefore, both driving wheels 4 are functionally connected to the motor 5 at the same rotation rate and therefore the vehicle according to the invention moves forward along a straight path.

If the user wishes to make the vehicle turn for example to the right, while keeping the control lever 31 that is arranged to the left in a backward position, he moves the control lever 31 that is arranged at the right to the substantially vertical inactive position. This movement of the right control lever leads to a rotation of the fork-like element 28 that is connected thereto in the direction that produces both the deactivation of the clutch coupling 12 that is interposed between the motion distribution shaft 6 and the driving wheel 4 arranged on the right, by virtue of the disengagement of the corresponding second coupling portion 14 from the corresponding toothed pulley 15, and the simultaneous activation of the braking device of the driving wheel 4 arranged on the right. In practice, the disengagement of the coupling portion 14 from the corresponding toothed pulley 15 causes the toothed pulley 15, by no longer being rigidly rotationally coupled to the motion distribution shaft 6, to no longer transmit, by means of the chain 17, the rotary motion to the right driving wheel 4, which due to the simultaneous activation of its braking device is stopped. Since the left driving wheel 4 is still engaged with the motion distribution shaft 6, it still has a given rotation rate, which allows the vehicle according to the invention to turn right about the right driving wheel 4, which by having a nil rotation rate in practice acts as a pivot, and therefore the vehicle, according to the invention, turns to the right with a tight turning radius.

The same operation performed with the control lever 31 that is arranged on the left allows the vehicle to turn left.

Moreover, if the user wishes to operate the vehicle in reverse, he activates the control device that actuates reversal of the rotation of the output shaft of the motor 5 and moves backwardly both control levers, if he wishes to travel along a straight path, or a preset control lever 31, if he wishes to turn in reverse.

It should be noted that if the user leaves the control levers 31, said levers, by way of the elastic return means, move automatically to the inactive position, with consequent disengagement of the motion distribution shaft 7 from the driving wheels and braking of said driving wheels, to the full benefit of safety. Moreover, thanks to the optional possibility of adjustment of the elastic return means, it is possible to vary the intervention times of the braking devices 23, with the consequent possibility to vary the space required by the vehicle to brake if the control levers 31 are released.

For the sake of completeness in description, it should also be added that in a preferred embodiment, each kinematic connection 32 comprises a pivot 40, which is supported so that it can rotate about its own axis by the chassis 2 and is arranged so that its axis is substantially parallel to the motion distribution shaft 6. Two connecting arms protrude laterally, with respect to the axis of the pivot 40 and on opposite sides, at the ends of said pivot 40; one connecting arm, designated by the reference numeral 41 in the figures, is articulated to the actuation bar 30 and is connected to the bar 34, and the other connecting arm (not shown in the figures) is rotatably connected to one end of a connecting linkage (also not shown in the figures), which in turn is rotatably connected at its other end to the end portion that lies opposite the control handle 31a of a respective control lever 31.

It should be noted that with this constructive solution of the kinematic connections 32, when the user pushes forward both control levers 31 the straight forward travel of the vehicle is actuated by the activation of the clutch couplings 12 and by the simultaneous deactivation of the braking devices 23 of both driving wheels 4. When instead the user pushes both control levers 31 backwardly, he actuates the quick braking of the vehicle 1, causing the disengagement of the clutch couplings 12 and the activation of the braking devices 23 of both driving wheels 4. To turn for example to the right, in this case the user has to therefore keep the control lever 31 that is arranged to the left in a forward position and push backwardly the lever that is located on the right, so as to lock rotationally the right driving wheel 4 and keep the left one in motion. To turn to the left, one of course proceeds in reverse to what has been described above. Finally, it should be noted that even with this constructive solution, if the user leaves both control levers 31, said levers, by virtue of the elastic return means, automatically return to the vertical position, causing gradual braking of the vehicle 1.

All the characteristics of the invention described above as advantageous, convenient or the like, may also be omitted or be replaced with equivalents.

The individual characteristics described with respect to general teachings or to particular embodiments may all be present in other embodiments or may replace characteristics in these other embodiments.

The invention thus conceived is susceptible of numerous modifications and variations, all of which are within the scope of the appended claims.

In practice it has been observed that the invention achieves, in all of its embodiments, the intended aim and objects.

In practice, the materials used, as well as the contingent shapes and dimensions, may be any according to requirements and to the state of the art.

All the details may further be replaced with other technically equivalent elements.

The disclosures in Italian Patent Application No. VR2004A000079 from which this application claims priority are incorporated herein by reference.

What is claimed is:

1. A self-propelled vehicle for making turns with tight turning radii, comprising: a chassis, provided with two driving wheels and forming at least one driving portion; a motor supported at said chassis; a motion distribution shaft kinematically connected to the motor; functional connection means provided between said motion distribution shaft and each one of said driving wheels, said functional connection means being individually activatable or deactivatable on command for independent actuation of one driving wheel with respect to the other; a toothed pulley; a sprocket that is rigidly associated with a respective one of said driving wheels; a pusher; and steering means that are adapted to act on said functional connection means;

and wherein said functional connection means comprise a respective clutch coupling, arranged between said motion distribution shaft and at least one of said driving wheels, said clutch coupling being activatable or deactivatable on command by way of said steering means, and a mechanical motion transmission arranged between said clutch coupling and a respective one of said driving wheels;

and wherein said mechanical motion transmission comprises a chain, which meshes with said toothed pulley, which is rotatably supported about said motion distribution shaft and winds around said sprocket, said clutch coupling comprising a first coupling portion, which is fixed to said motion distribution shaft, and a second coupling portion, which is fitted so as to be slidable on, and rotate jointly with said motion distribution shaft, said toothed pulley being interposed between said first and second coupling portions;

and wherein said steering means comprise actuation means, which are functionally connected to said pusher, which acts on the second coupling portion to make said second coupling portion slide along said motion distribution shaft from a deactivation position, in which said second coupling portion is disengaged from said toothed pulley, to an activation position, in which said first and second coupling portions are coupled to said toothed pulley, in order to rigidly rotationally associate said toothed pulley with said motion distribution shaft.

2. The vehicle of claim 1, comprising a respective clutch coupling arranged between said motion distribution shaft and each one of said driving wheels.

3. The vehicle of claim 1, comprising a first clutch element that is interposed between said first coupling portion and said toothed pulley, and a second clutch element that is interposed between said second coupling portion and said toothed pulley, said first and second clutch elements being made of a material that has a high friction coefficient.

4. The vehicle of claim 1, wherein said actuation means are functionally connected to a braking device of a respective one of said wheels for substantially simultaneous activation or deactivation of said clutch coupling and of said braking device.

5. The vehicle of claim 4, comprising elastic return means operatively connecting to said actuation means, said pusher comprising an annular body, which is arranged as to be slidable on said motion distribution shaft, said actuation means being adapted to act on said pusher for translational motion thereof along said distribution shaft in a direction that causes transition of said second coupling portion from said deactivation position to said activation position, and on said braking device in order to deactivate the braking device in contrast with action of said elastic return means.

6. The vehicle of claim 5, wherein said actuation means comprise a fork-like element provided with arms; an actuation bar; a control lever; and a control handle, said fork-like element being articulated, with a first end of said arms, at two diametrically opposite regions of an outer lateral surface of said annular body and pivoted to said chassis, in an intermediate portion of said arms, and about an axis that is substantially perpendicular to said motion distribution shaft, said fork-like element being pivoted, at a second end of said arms, to a first longitudinal end of said actuation bar, which is elastically loaded by said elastic return means and is kinematically connected, at a second opposite longitudinal end, to a first end of said control lever, which is pivoted, in an intermediate portion thereof, to said chassis about an axis that is substantially perpendicular to a longitudinal direction, said control lever having said control handle connected at a second, opposite end thereof.

7. The vehicle of claim 6, comprising a lever element and a rod-like actuation element, said fork-like element being rigidly connected to said lever element, which acts on said rod-like actuation element that is functionally associated with said braking device.

8. The vehicle of claim 1, wherein said motor is constituted by a reversible electric motor.

9. The vehicle of claim 1, further comprising at least one self-orientating castor, which is supported by said chassis so as to be rotatable about a substantially vertical axis.

10. A self-propelled vehicle for making turns with tight turning radii, comprising: a chassis, provided with two driving wheels and forming at least one driving portion; a braking devices for braking said driving wheels; a motor supported at said chassis; a motion distribution shaft kinematically connected to the motor; functional connection means provided between said motion distribution shaft and each one of said driving wheels, said functional connection means being individually activatable or deactivatable on command for independent actuation of one driving wheel with respect to the other; a toothed pulley; a sprocket that is rigidly associated with a respective one of said driving wheels; a pusher; and steering means that are adapted to act on said functional connection means;

and wherein said functional connection means comprise:
a respective clutch coupling, arranged between said motion distribution shaft and at least one of said driving wheels, said clutch coupling being activatable or deactivatable on command by way of said steering means;

and a mechanical motion transmission arranged between said clutch coupling and a respective one of said driving wheels;

and wherein said mechanical motion transmission comprises a chain, which meshes with said toothed pulley, which is rotatably supported about said motion distribution shaft and winds around said sprocket, said clutch coupling comprising a first coupling portion, which is fixed to said motion distribution shaft, and a second coupling portion, which is fitted so as to be slidable on, and rotate jointly with said motion distribution shaft, said toothed pulley being interposed between said first and second coupling portions;

and wherein said steering means comprise actuation means, which are functionally connected to said pusher, which acts on the second coupling portion to make said second coupling portion slide along said motion distribution shaft from a deactivation position, in which said second coupling portion is disengaged from said toothed pulley, to an activation position, in which said first and second coupling portions are coupled to said toothed pulley, in order to rigidly rotationally associate said toothed pulley with said motion distribution shaft, said actuation means being functionally connected to the braking device of a respective one of said wheels for substantially simultaneous activation or deactivation of said clutch coupling and of said braking device.

11. A self-propelled vehicle for making turns with tight turning radii, comprising: a chassis, provided with two driving wheels and forming at least one driving portion; a braking devices for braking said driving wheels; a motor supported at said chassis; a motion distribution shaft kinematically connected to the motor; functional connection means provided between said motion distribution shaft and each one of said driving wheels, said functional connection means being individually activatable or deactivatable on command for independent actuation of one driving wheel with respect to the other; a toothed pulley; a sprocket that is rigidly associated with a respective one of said driving wheels; a pusher; elastic return means suitable to act on said braking devices; and steering means that are adapted to act on said functional connection means;

and wherein said functional connection means comprise:
a respective clutch coupling, arranged between said motion distribution shaft and at least one of said driving wheels, said clutch coupling being activatable or deactivatable on command by way of said steering means; and a mechanical motion transmission arranged between said clutch coupling and a respective one of said driving wheels;

and wherein said mechanical motion transmission comprises a chain, which meshes with said toothed pulley, which is rotatably supported about said motion distribution shaft and winds around said sprocket, said clutch coupling comprising a first coupling portion, which is fixed to said motion distribution shaft, and a second coupling portion, which is fitted so as to be slidable on, and rotate jointly with said motion distribution shaft, said toothed pulley being interposed between said first and second coupling portions;

and wherein said steering means comprise actuation means, which are functionally connected to said pusher, which acts on the second coupling portion to make said second coupling portion slide along said motion distribution shaft from a deactivation position, in which said second coupling portion is disengaged from said toothed pulley, to an activation position, in which said first and second coupling portions are coupled to said toothed pulley, in order to rigidly rotationally associate said toothed pulley with said motion distribution shaft, said actuation means being functionally connected to the braking device of a respective one of said wheels for substantially simultaneous activation or deactivation of said clutch coupling and of said braking device;

and wherein said elastic return means are operatively connected with said actuation means, said pusher comprising an annular body, which is arranged as to be slidable on said motion distribution shaft, said actuation means being adapted to act on said pusher for translational motion thereof along said distribution shaft in a direction that causes transition of said second coupling portion from said deactivation position to said activation position, and on said braking device in order to deactivate the braking device in contrast with action of said elastic return means.

* * * * *